(12) United States Patent
Laichinger et al.

(10) Patent No.: US 10,533,517 B2
(45) Date of Patent: Jan. 14, 2020

(54) CYLINDER HEAD COVER AND METHOD FOR PRODUCING A CYLINDER HEAD COVER

(71) Applicant: ElringKlinger AG, Dettingen (DE)

(72) Inventors: Peter Laichinger, Laichingen (DE); Daniel Ruff, Notzingen (DE)

(73) Assignee: ElringKlinger AG, Dettingen (DE)

( * ) Notice: Subject to any disclaimer, the term of this patent is extended or adjusted under 35 U.S.C. 154(b) by 93 days.

(21) Appl. No.: 15/390,643

(22) Filed: Dec. 26, 2016

(65) Prior Publication Data
US 2017/0107939 A1  Apr. 20, 2017

Related U.S. Application Data

(63) Continuation of application No. PCT/EP2015/063961, filed on Jun. 22, 2015.

(30) Foreign Application Priority Data

Jun. 27, 2014  (DE) .................. 10 2014 109 075

(51) Int. Cl.
*F02F 7/00* (2006.01)
*F16K 31/126* (2006.01)
(Continued)

(52) U.S. Cl.
CPC ........... *F02F 7/006* (2013.01); *F01M 13/023* (2013.01); *F16K 31/1266* (2013.01); *F01M 2013/0016* (2013.01); *F02F 2200/00* (2013.01)

(58) Field of Classification Search
CPC ........ F02F 7/006; F02F 7/0065; F02F 11/002; F02F 2200/00; F01M 2013/0016; F01M 2013/0027; F01M 2013/0038; F01M 2013/0044; F01M 2013/0488; F01M 13/023; F01M 13/011; F01M 13/04; F01M 13/0033; F01M 13/022; F01M 13/0416; F16K 31/1266; F16K 31/128;
(Continued)

(56) References Cited

U.S. PATENT DOCUMENTS 4,602,595 A * 7/1986 Aoki .................. F01M 13/0416
 123/41.86
4,607,604 A * 8/1986 Kanoh ............... F01M 13/0416
 123/572
(Continued)

FOREIGN PATENT DOCUMENTS

CN 101 943 078 A 1/2011
CN 103 328 798 A 9/2013
(Continued)

*Primary Examiner* — George C Jin
(74) *Attorney, Agent, or Firm* — Aslan Law, P.C.

(57) ABSTRACT

The object of the invention is to provide a cylinder head cover which comprises an integrated valve device and is easy to produce. To achieve this object, according to the invention the cylinder head cover comprises the following: a cover body which, when the cylinder head cover is mounted, is arranged on an engine block of the internal combustion engine and covers a cylinder head of the internal combustion engine; a valve device comprising a valve body and a main body for receiving the valve body, the main body of the valve device being secured to an inner face of the cover body by means of a weld joint.

14 Claims, 7 Drawing Sheets

(51) Int. Cl.
*F01M 13/02* (2006.01)
*F01M 13/00* (2006.01)

(58) Field of Classification Search
CPC .. F16K 31/385; F16K 31/1268; F16K 31/365; G05D 16/0661; G05D 16/0663
See application file for complete search history.

(56) References Cited

U.S. PATENT DOCUMENTS

| | | | |
|---|---|---|---|
| 6,024,058 A * | 2/2000 | Burnett | F01M 13/04 123/41.86 |
| 6,709,477 B1 * | 3/2004 | Håkansson | B01D 45/14 123/573 |
| 7,117,858 B2 | 10/2006 | Nonaka et al. | |
| 2001/0013367 A1 * | 8/2001 | Miura | B60K 15/04 137/592 |
| 2004/0035403 A1 | 2/2004 | Pateman et al. | |
| 2005/0188937 A1 | 9/2005 | Hilpert et al. | |
| 2006/0112916 A1 | 6/2006 | Yoshijima et al. | |
| 2008/0295796 A1 * | 12/2008 | Dunsch | F01L 1/053 123/195 C |
| 2009/0308337 A1 | 12/2009 | Imhof | |
| 2011/0179755 A1 | 7/2011 | Gruhler et al. | |
| 2012/0006306 A1 | 1/2012 | Boehm et al. | |
| 2012/0167845 A1 | 7/2012 | Sands et al. | |
| 2014/0245977 A1 * | 9/2014 | Krystufek | F01M 13/04 123/41.86 |

FOREIGN PATENT DOCUMENTS

| | | |
|---|---|---|
| DE | 33 26 881 A1 | 5/1984 |
| DE | 10 2004 004 753 A1 | 8/2005 |
| DE | 602 19 466 T2 | 1/2008 |
| DE | 10 2005 056 902 B4 | 9/2008 |
| DE | 10 2008 028 543 B3 | 10/2009 |
| DE | 10 2011 106 593 A1 | 1/2012 |
| EP | 1 790 836 A2 | 5/2007 |
| EP | 1 998 034 A2 | 12/2008 |
| JP | S61 58609 U | 4/1986 |
| JP | 2001 263036 A | 9/2001 |
| WO | WO 2010/017903 A1 | 2/2010 |
| WO | WO 2013/059588 A1 | 4/2013 |

* cited by examiner

CYLINDER HEAD COVER AND METHOD FOR PRODUCING A CYLINDER HEAD COVER

RELATED APPLICATION

This application is a continuation of international application No. PCT/EP2015/063961 filed on Jun. 22, 2015, and claims the benefit of German application No. DE 10 2014 109 075.6 filed on Jun. 27, 2014 which are incorporated herein by reference in their entirety and for all purposes.

FIELD OF DISCLOSURE

The present invention relates to a cylinder head cover which comprises a cover body which in the installed state of the cylinder head is arranged on an engine block of an internal combustion engine and covers a cylinder head of the internal combustion engine, in particular a cylinder space or valve space of the internal combustion engine.

BACKGROUND

A valve device for influencing pressure, in particular for regulating pressure, and/or an oil-separation device for separating oil out of blow-by gases may be arranged on a cylinder head cover of this type. In particular, a valve device and/or an oil-separation device can be fixed to an outer side of the cover body after production of the cover body of the cylinder head cover, for example by means of a clip-fit connection or a latching connection. Under certain operating conditions of the internal combustion engine, the fixing to the outer side of the cover body may lead to undesired icing or freezing of the valve device.

SUMMARY OF THE INVENTION

The present invention is based on the object of providing a cylinder head cover which comprises an integrated valve device and is simple to manufacture.

According to the invention, this object is achieved by a cylinder head cover for an internal combustion engine which comprises the following:
- a cover body, which in the installed state of the cylinder head cover is arranged on an engine block of the internal combustion engine and covers a cylinder head of the internal combustion engine;
- a valve device which comprises a valve body and a base body for receiving the valve body,
- wherein the base body of the valve device is fixed to an inner side of the cover body, preferably by means of a welded joint.

The fact that in the cylinder head cover according to the invention a base body of the valve device is fixed to the inner side of the cover body, preferably by means of a welded joint, makes it easy to produce a cylinder head cover with an integrated valve device.

It may be advantageous if a plurality of chambers of the valve device are formed by means of the base body and the cover body.

It is possible to provide for the valve device to comprise a covering element.

The covering element is preferably fixed to the base body of the valve device by means of a welded joint, in order to cover one or more chambers of the valve device.

The valve device preferably comprises an oil-separation device or is preferably part of an oil-separation device.

A cylinder head cover with an integrated valve device can be produced in a simple way in particular if a base body of the valve device is fixed to an inner side of the cover body by means of a welded joint and if a covering element is fixed to the base body by means of a welded joint, in order to cover one or more chambers of the valve device.

The valve body of the valve device is preferably of multi-part configuration.

In particular, it is possible to provide for the valve body to comprise a pressure-regulating valve lid, a diaphragm, a support plate and/or a spring element.

The valve body, in particular the pressure-regulating valve lid, the diaphragm, the support plate and/or the spring element, are preferably arrangeable and/or fixable in the base body of the valve device before the base body is fixed to the inner side of the cover body by means of the welded joint.

The valve device, in particular the base body of the valve device, preferably projects into an interior space of the cover body.

It may be favorable for the valve device, in particular the base body of the valve device, to allow gas disposed inside the cover body, in particular crank-case gas, to flow around it on two sides, on three sides, on four sides or on five sides.

Preferably, a fluid-tight connection between the covering element and the base body is formed by means of the welded joint for fixing the covering element to the base body.

Preferably, one or more chambers are sealed off in a fluid-tight manner with respect to a cylinder head space or a valve space by means of the welded joint between the base body and the covering element.

Preferably, a fluid-tight connection between the base body and the cover body is formed by means of the welded joint between the base body and the cover body.

Preferably, one or more chambers of the valve device are sealed off in a fluid-tight manner with respect to a cylinder head space or a valve space by means of the welded joint between the cover body and the base body.

It is possible to provide for the valve device to comprise at least three chambers which are covered and/or sealed off by means of the covering element.

The cover body, the base body and/or the covering element preferably comprise a plastics material or are formed from a plastics material.

It is possible for the cover body, the base body and/or the covering element to be formed as injection-molded components.

In particular, it is possible to provide for the cover body, the base body and/or the covering element to be formed as plastics injection-molded components.

Preferably, the base body of the valve device comprises at least one oil-separation element, at least one flow-diversion element, at least one oil-collection chamber, at least one filter receptacle for receiving a filter element and/or at least one valve receptacle for receiving a valve body, in particular a pressure-regulating valve device and/or a drainage valve device.

The base body is preferably formed integrally with at least one oil-separation element, at least one flow-diversion element, at least one oil-collection chamber, at least one filter receptacle for receiving a filter element and/or at least one valve receptacle for receiving a valve body, in particular a pressure-regulating valve device and/or a drainage valve device.

In a configuration of the invention, it is possible to provide for two or more chambers of the valve device to be closed off in a fluid-tight manner with respect to an environment surrounding the valve device by means of the covering element.

As an alternative or in addition to this, it is possible to provide for two or more chambers of the valve device to be fluid-connected to one another by means of the covering element.

For this purpose, the covering element may in particular comprise a channel structure, for example a recess. By means of the channel structure, preferably a fluid is guidable past a partition wall for separating two chambers.

Preferably, the valve device comprises a pressure-regulating valve device for regulating an internal pressure of a cylinder head space relative to an external pressure in an external environment surrounding the cylinder head cover.

It may be expedient if the valve device comprises a reference chamber which adjoins the cover body and is in fluid communication with an external environment surrounding the cylinder head cover by means of a through-opening, in particular a reference pressure hole disposed in the cover body.

It is possible to provide for the valve device to comprise a suction chamber which adjoins the cover body.

The cover body preferably comprises at least one suction connection piece.

It may be expedient for the valve device to comprise a suction chamber which adjoins a suction connection piece of the cover body and/or is connected to a suction connection piece of the cover body.

By means of the suction connection piece, the suction chamber is preferably accessible in fluid terms from outside the cylinder head cover.

In particular, a gas, for example clean gas, can be sucked out of the suction chamber of the valve device by applying a reduced pressure to the suction connection piece.

The present invention also relates to a method for producing a cylinder head cover.

In this respect, the present invention is based on the object of providing a method by means of which it is easy to produce a cylinder head cover which comprises an integrated valve device.

According to the invention, this object is achieved by virtue of the method for producing a cylinder head cover comprising the following:
providing a cover body which in the installed state of the cylinder head cover is arranged on an engine block of the internal combustion engine and covers a cylinder head of the internal combustion engine;
providing a base body of a valve device;
fixing the base body of the valve device to an inner side of the cover body, preferably by means of a welded joint.

The method according to the invention preferably includes one or more of the features and/or advantages described in connection with the cylinder head cover according to the invention.

The cover body, the base body and/or the covering element are preferably produced in a plastics injection-molding process.

In particular, the cover body, the base body and/or the covering element are each produced integrally in a plastics injection-molding process.

At least one valve body, in particular a pressure-regulating valve device, is preferably introduced into a valve receptacle of the base body of the valve device, in particular before the base body is fixed to the cover body.

In particular, it is possible to provide for a pressure-regulating valve lid, a diaphragm, a support plate and/or a spring element to be introduced into a valve receptacle of the base body of the valve device and/or latched to the base body of the valve device.

It may be advantageous if at least one filter element is introduced into a filter receptacle of the base body of the valve device, in particular before the base body is fixed to the cover body.

Furthermore, the cylinder head cover according to the invention and/or the method according to the invention for producing a cylinder head cover may have one or more of the advantages and/or features described below.

Preferably, the cover body, the base body and the covering element form walls of at least one chamber of the valve device.

By means of the base body, in particular four walls of one or more chambers of the valve device are formed, with a further wall being formed by the cover body and a further wall being formed by the covering element.

The cover body and the covering element preferably form opposite walls of one or more chambers of the valve device.

The valve device is preferably disposed and/or formed substantially completely inside the cover body.

The valve device, in particular the pressure-regulating valve device of the valve device, can preferably be used to regulate a pressure in the cylinder head space and/or in a crankcase of the internal combustion engine.

A suction connection piece of the cover body, via which a suction chamber of the valve device is accessible, is preferably connected to an intake device of the internal combustion engine, in order for blow-by gases to be sucked out of the cylinder head space through the valve device.

The pressure-regulating valve device can preferably be used to carry out a comparison between an external pressure in an environment surrounding the cylinder head cover and a pressure in the cylinder head space, in particular in the valve device. The pressure-regulating valve device can be used in particular to produce a fluid connection between an inlet of the valve device and the suction chamber for sucking out gas when a pressure in the cylinder head space exceeds a predetermined pressure, in particular exceeds the external pressure.

Preferably, at least two, in particular at least three, chambers of the valve device are separated from one another and/or sealed off with respect to one another by connecting, in particular welding, the base body of the valve device to the cover body and/or the covering element to the base body of the valve device.

There is preferably no need for an additional component to complete the chambers, in particular a seal.

Further preferred features and/or advantages of the invention form the subject matter of the following description and of the drawing illustrating an exemplary embodiment.

Figure 1:
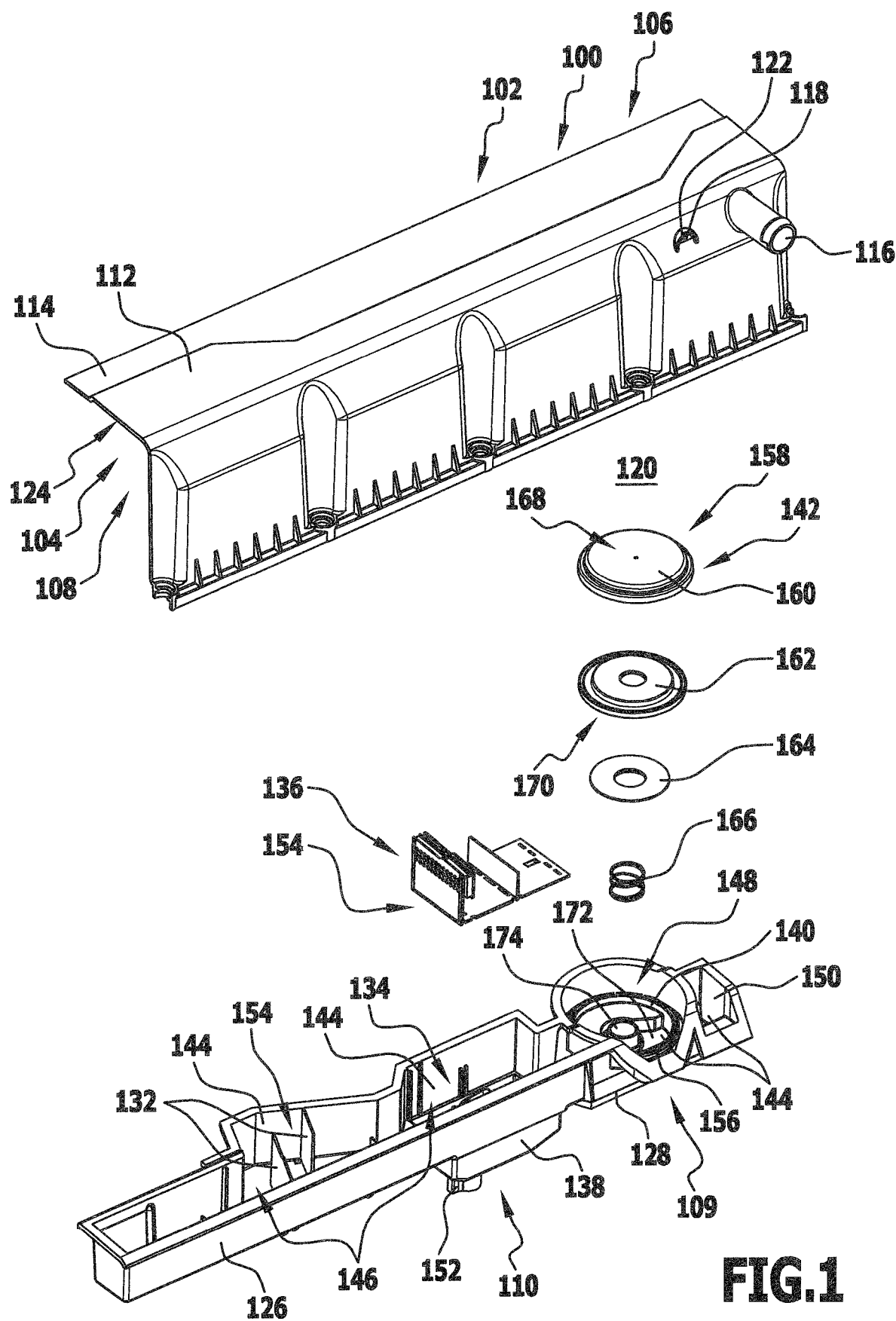
FIG. 1 shows a schematic, perspective exploded view of a cylinder head cover which comprises a valve device.
Figure 2:
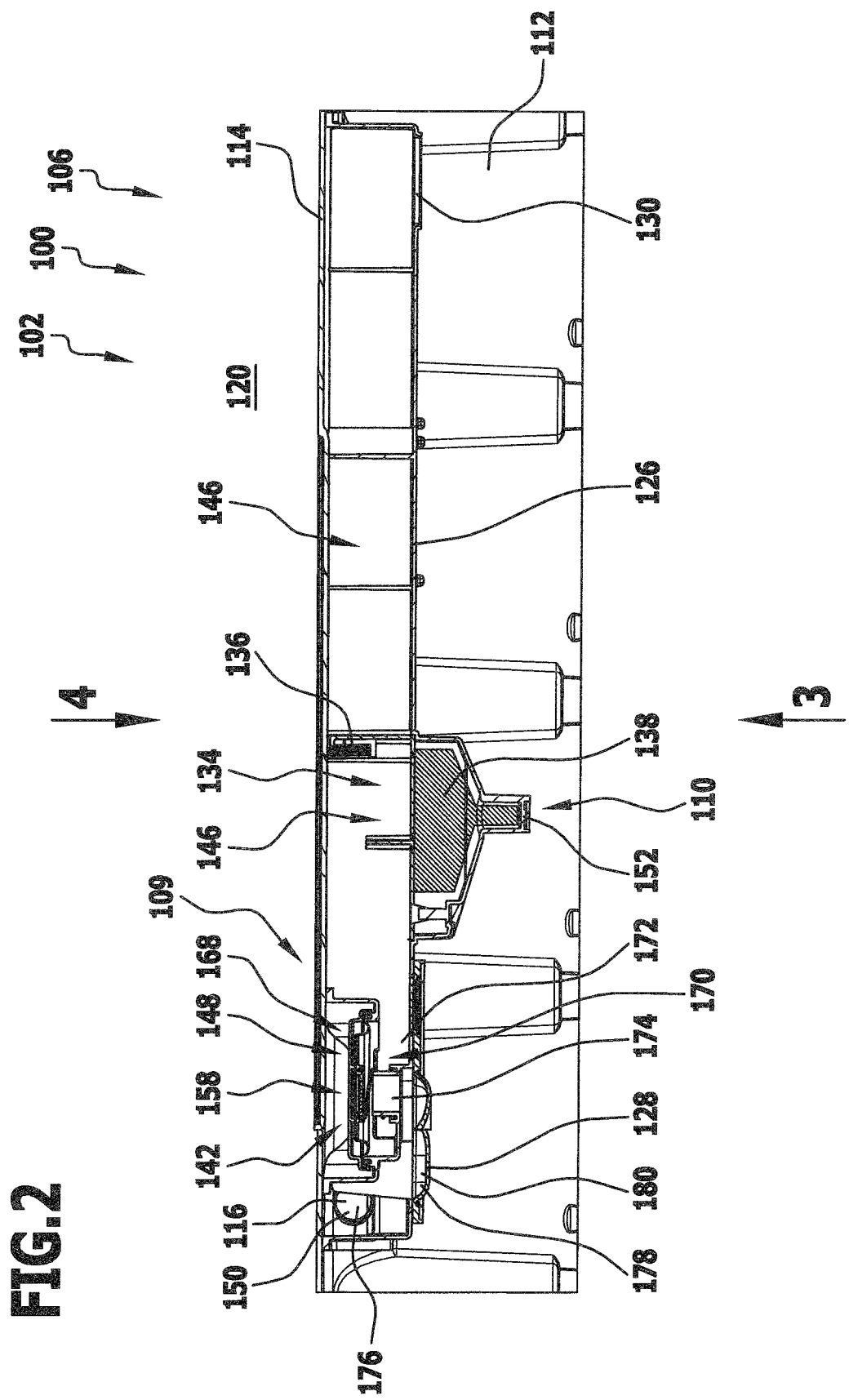
FIG. 2 shows a schematic vertical longitudinal section through the cylinder head cover from FIG. 2.
Figure 3:
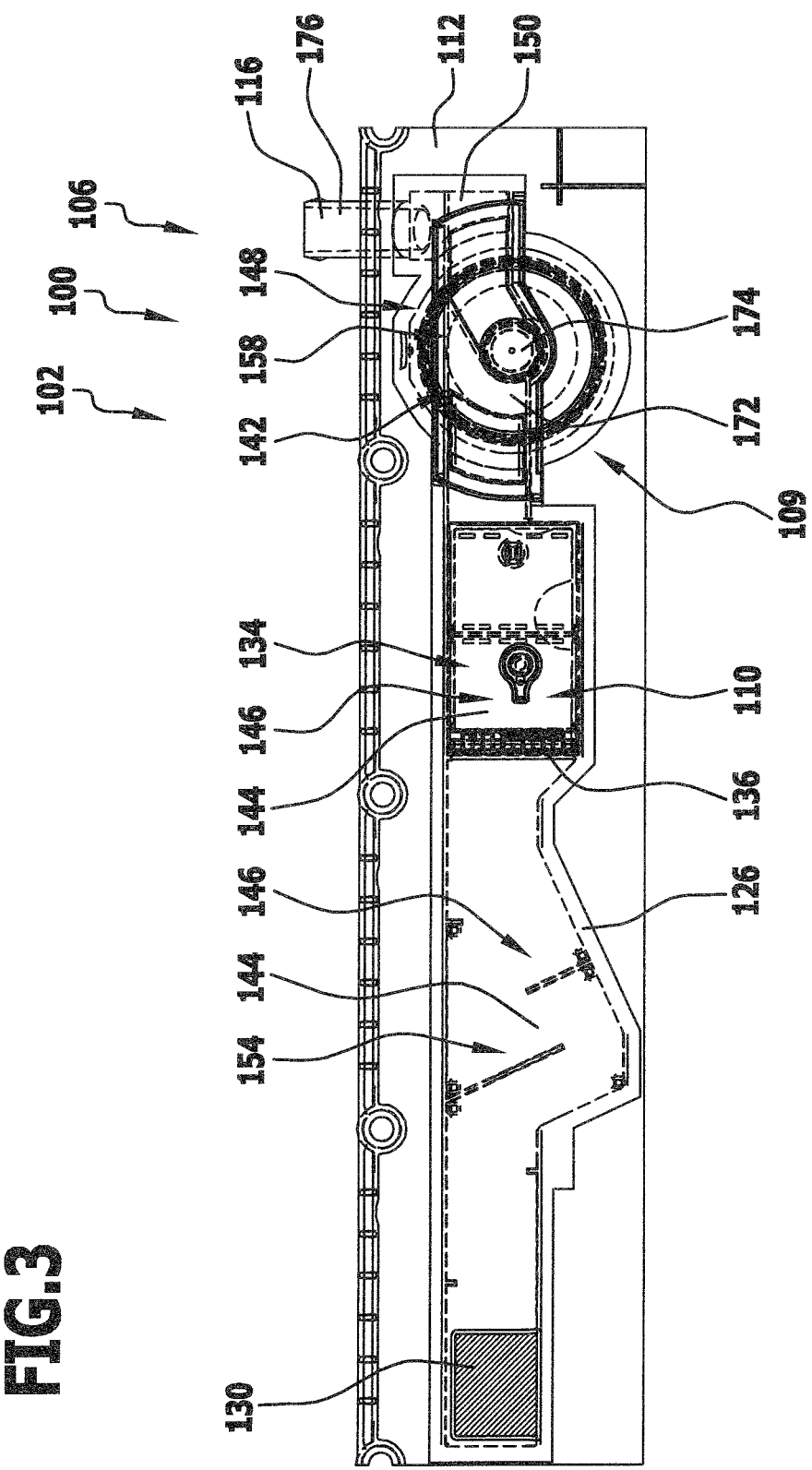
FIG. 3 shows a schematic, partially transparent plan view of an underside of the cylinder head cover from FIG. 2, as seen in the direction indicated by the arrow 3 in FIG. 2.
Figure 4:
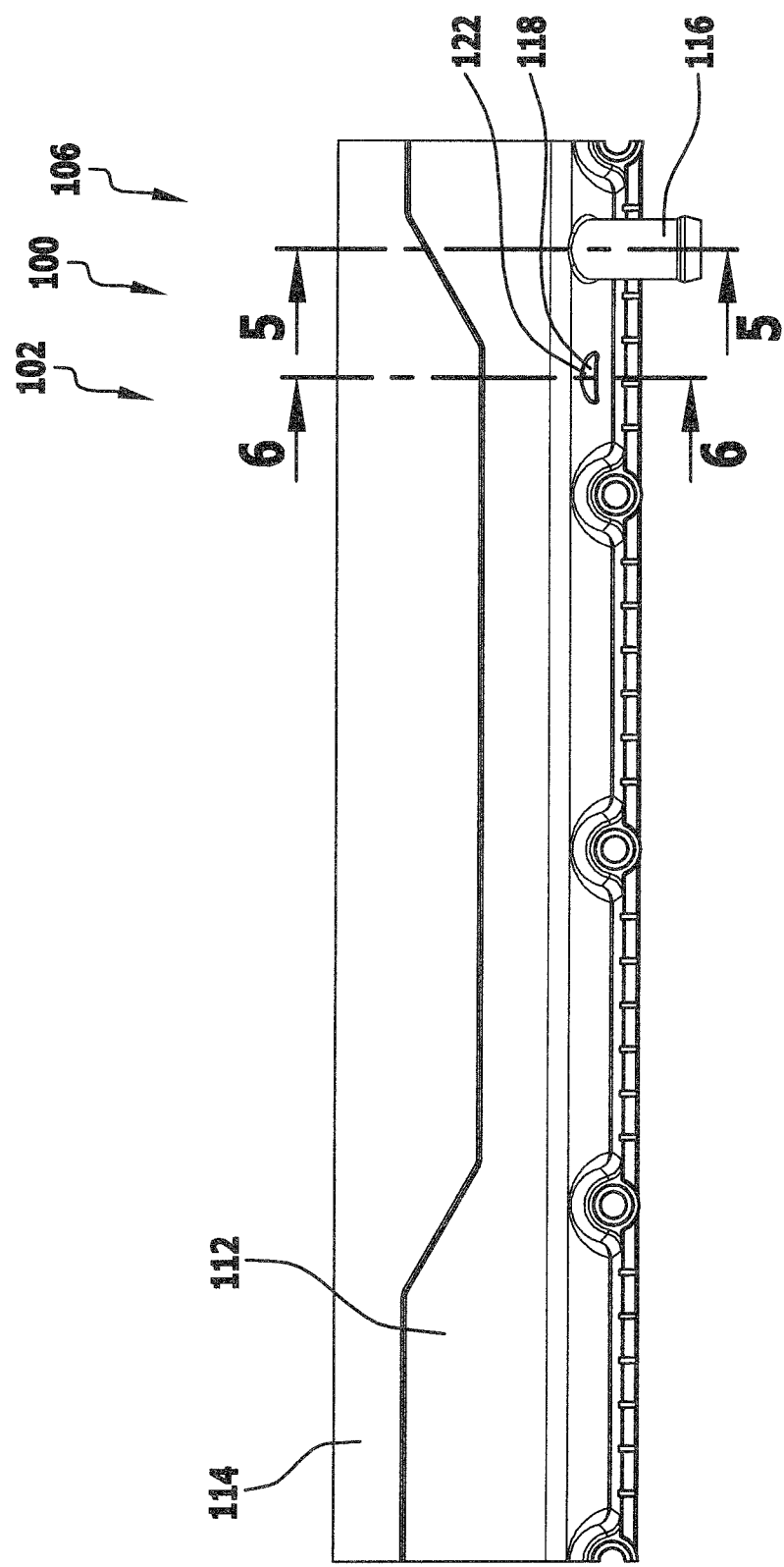
FIG. 4 shows a schematic plan view of a top side of the cylinder head cover from FIG. 2, as seen in the direction indicated by the arrow 4 in FIG. 2.
Figure 5:
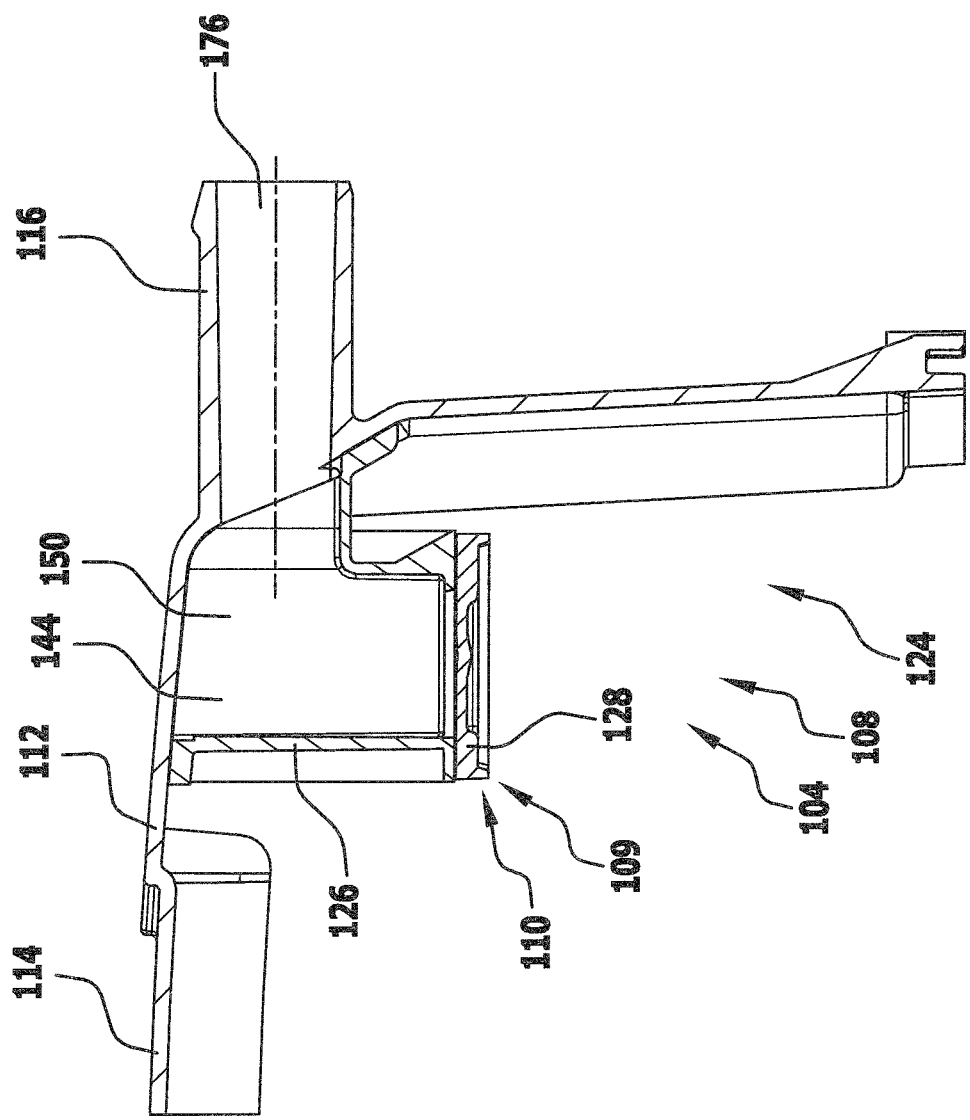
FIG. 5 shows a schematic vertical cross section through the cylinder head cover from FIG. 2 on line 5-5 in FIG. 4.

Identical or functionally equivalent elements are provided with the same reference designations in all the figures.

DETAILED DESCRIPTION OF THE DRAWINGS

An embodiment, illustrated in FIGS. 1 to 7, of a cylinder head cover, denoted overall by 100, is used in particular to cover a cylinder head (not shown) of an internal combustion engine, denoted overall by 102.

The cylinder head cover 100 is used in particular to cover a cylinder head space 104.

The cylinder head cover 100 may be formed for example as a valve cover 106 for covering a valve space 108 of the internal combustion engine 102.

FIGS. 1 to 7 in each case illustrate only a part of the cylinder head cover 100, namely the part in which a valve device 109 is disposed and/or formed.

The cylinder head cover 100 as a whole is preferably of substantially cuboidal configuration and surrounds the cylinder head space 104 preferably substantially on five sides.

The valve device 109 may be provided separately.

However, it is also possible for the valve device 109 to comprise an oil-separation device 110 or to be part of an oil-separation device 110.

The oil-separation device 110 is used in particular to separate oil out of a gas disposed in the cylinder head space 104.

The gas is in particular blow-by gas which is formed during operation of the internal combustion engine 102.

The cylinder head cover 100 comprises a cover body 112, by means of which walls 114, in particular five walls 114 delimiting the cylinder head space 104, are formed.

The cover body 112 is in particular fixable to an engine block (not shown) of the internal combustion engine 112, for example by means of screw-connections.

The cover body 112 preferably comprises a suction connection piece 116 and a through-opening 118.

The suction connection piece 116 and the through-opening 118 in particular allow a fluid connection between the cylinder head space 104 and an external environment 120 surrounding the cylinder head cover 100.

The through-opening 118 forms in particular a reference pressure hole 122 of the valve device 109.

The valve device 109 is disposed and/or formed in particular on an inner side 124, facing the cylinder head space 104, of the cover body 112.

The valve device 109 preferably comprises a base body 126 and a covering element 128.

The base body 126 and the covering element 128 of the valve device 109 and also the cover body 112 of the cylinder head cover 100 are preferably plastics injection-molded components.

The base body 126 comprises an inlet 130, one or more flow-diversion elements 132, a filter receptacle 134 for receiving a filter element 136, an oil-collection chamber 138 and/or a valve receptacle 140 for receiving a pressure-regulating valve device 142.

The one or more flow-diversion elements 132, the filter receptacle 134, the oil-collection chamber 138 and the valve receptacle 140 are preferably formed integrally with the base body 126, in particular during production of the base body 126.

A plurality of chambers 144 of the valve device 109 are formed by means of the base body 126, the cover body 112 and the covering element 128.

In particular, an oil-separation chamber 146, a reference chamber 148 and a suction chamber 150 are formed.

The oil-collection chamber 138 adjoins in particular the oil-separation chamber 146 and serves to receive oil separated out in the oil-separation chamber 146.

The oil-collection chamber 138 is adjoined by a drainage valve 152, through which oil collected in the oil-collection chamber 138 can be discharged from the oil-separation device 110.

The flow-diversion elements 132, the filter receptacle 134 and the filter element 136 are preferably disposed in the oil-separation chamber 146 and are used to separate oil out of a gas stream passed through the oil-separation chamber 146.

The flow-diversion elements 132 and the filter element 136 in particular form oil-separation elements 154 of the oil-separation device 110.

In particular, the valve receptacle 140 for receiving the pressure-regulating valve device 142 is disposed in the reference chamber 148.

The valve receptacle 140 in particular comprises a latching device 156 for fixing the pressure-regulating valve device 142.

The pressure-regulating valve device 142 is in particular a valve body 158 for optionally opening or closing a fluid connection.

For this purpose, the pressure-regulating valve device 142 comprises in particular a pressure-regulating valve lid 160, a diaphragm 162, a support plate 164 and a spring element 166, which are receivable in the valve receptacle 140 and are latchable by means of the latching device 156.

In the installed state of the cylinder head cover 100 (cf. FIGS. 2 to 6), different pressures are applied to a top side 168 of the pressure-regulating valve device 142 and an underside 170 of the pressure-regulating valve device 142.

In particular, an external pressure which prevails in the environment 120 surrounding the cylinder head cover 100 is present at the top side 168. For this purpose, that part of the reference chamber 148 which adjoins the top side 168 is fluid-connected to the environment 120 surrounding the cylinder head cover 100 by means of the through-opening 118, in particular by means of the reference pressure hole 122.

In particular an internal pressure which prevails in the oil-separation chamber 146 is present at the underside 170 of the pressure-regulating valve device 142, in particular at an underside 170 of a diaphragm 162 of the pressure-regulating valve device 142. For this purpose, the underside 170 of the pressure-regulating valve device 142 is fluid-connected to the oil-separation chamber 146, in particular by means of a supply channel 172.

Furthermore, a discharge channel 174 adjoins the underside 170 of the pressure-regulating valve device 142, in particular of the diaphragm 162.

In the closed state of the pressure-regulating valve device 142, the diaphragm 162 bears, preferably in sealing fashion, against the discharge channel 174, so that the supply channel 172 and the discharge channel 174 are fluid-separated from one another.

The discharge channel 174 opens out in particular into the suction chamber 150 and is thus connectable via the suction connection piece 116 to a suction device (not shown).

The suction connection piece 116 therefore forms in particular an outlet 176 of the valve device 109, through which gas which has been cleaned in particular by means of the oil-separation device 110 (clean gas) can be discharged.

The covering element 128 serves on the one hand to delimit at least one chamber 144 of the valve device 109.

Figure 6:
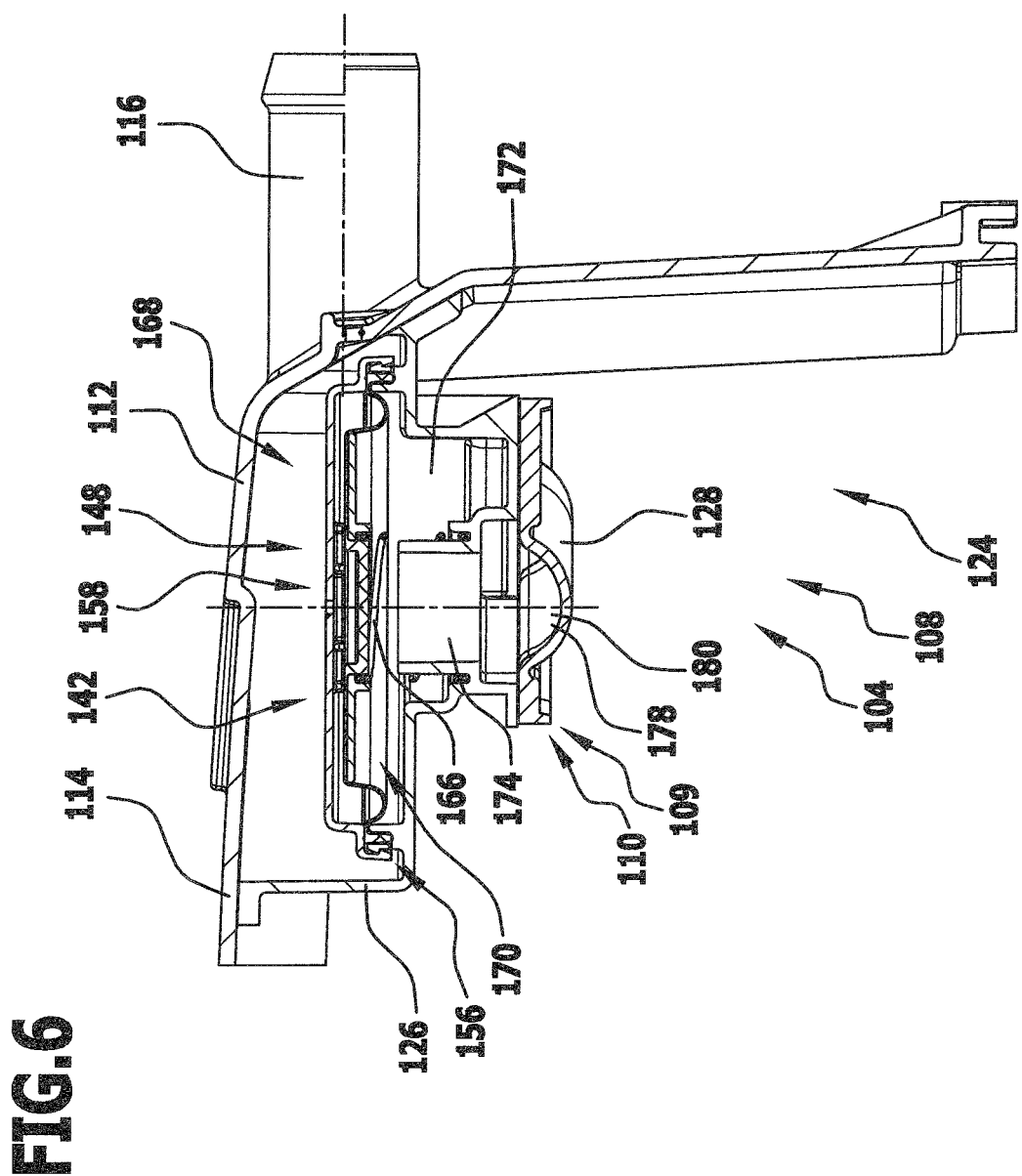
FIG. 6 shows a schematic vertical cross section through the cylinder head cover from FIG. 2 on line 6-6 in FIG. 4.
Figure 7:
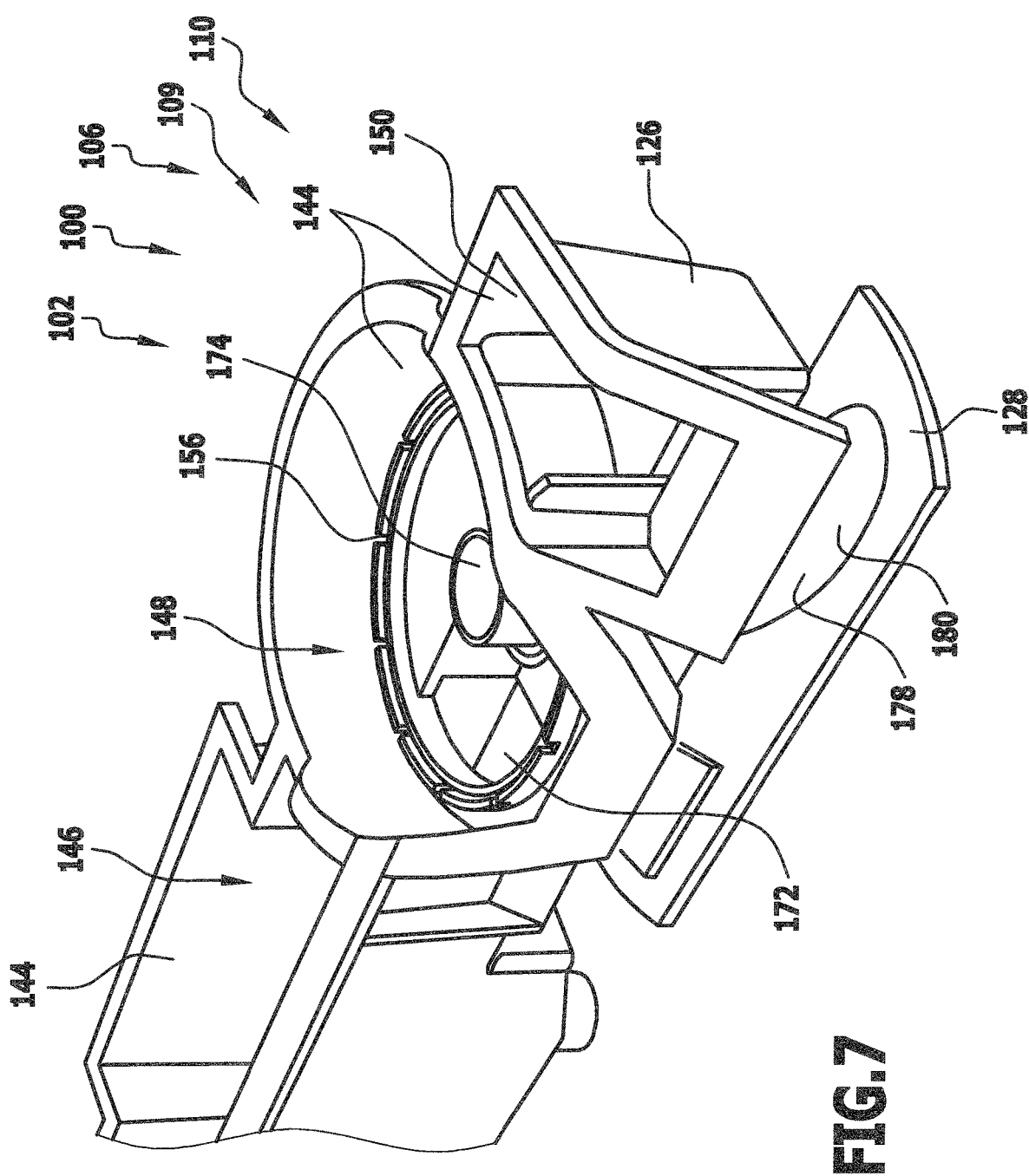
FIG. 7 shows a schematic perspective illustration of a base body and of a covering element of the valve device.

As can be seen in particular from FIG. 6, on the other hand, however, a recess 178 or a channel 180 is also provided in or on the covering element 128.

By means of the recess 178 or the channel 180, in particular it is possible to produce a fluid connection between two chambers 144 of the valve device 109.

In particular, it is possible to produce a connection between the oil-separation chamber 146 and the reference chamber 148 and/or between the reference chamber 148 and the suction chamber 150 by means of a recess 178 or a channel 180 of the covering element 128.

The cylinder head cover 100 described above is producible in particular as follows:

First of all, the cover body 112, the base body 126 and the covering element 128 are each produced separately as plastics injection-molded components using an injection-molding process.

In a following step, the pressure-regulating valve lid 160, the diaphragm 162, the support plate 164 and the spring element 166 are introduced into the valve receptacle 140 of the base body 126 of the valve device 109 and fixed by means of the latching device 156.

Furthermore, the filter element 136, which comprises for example a nonwoven element for separating out oil, is disposed in the filter receptacle 134.

Thereafter, the base body 126 is fixed to the inner side 124 of the cover body 112, in particular by welding the base body 126 to the cover body 112.

As a result of this welding of the base body 126 to the cover body 112, in particular the initially open chambers 144 of the valve device 109 are covered and closed in a fluid-tight manner at least on one side.

In a further step, or alternatively before the base body 126 is welded to the cover body 112, the covering element 128 is disposed on the base body 126, in particular by means of a welded joint.

Preferably, one or more chambers 144 of the valve device 109 are also covered and/or closed off in a fluid-tight manner by means of the covering element 128.

In particular, a plurality of chambers 144, for example the oil-separation chamber 146, the reference chamber 148 and the suction chamber 150, are at least in portions delimited on the one hand by the cover body 112 and on the other hand by the covering element 128.

The base body 126 is fixed to the cover body 112 in particular in such a way that the reference chamber 148 adjoins the through-opening 118, in particular the reference pressure hole 122.

Furthermore, the suction chamber 150 preferably adjoins the suction connection piece 116.

By virtue of the base body 126 being welded to the cover body 112, on the one hand, and the covering element 128 being welded to the base body 126, on the other hand, the chambers 144 of the valve device 109 can be reliably sealed. In particular, there is in this case no need for any additional seals.

The cylinder head cover 100 described above functions as follows:

During operation of the internal combustion engine 102, oil-enriched gases, in particular blow-by gases, collect in the cylinder head space 104 and are sucked out via the pressure-regulating valve device 142 by means of a suction device (not shown).

As soon as a predetermined pressure difference is exceeded between the cylinder head space 104 and the suction device, a connection between the cylinder head space 104 and the suction device can be broken by means of the pressure-regulating valve device 142, by virtue of the pressure-regulating valve device 142 being closed.

This is achieved in particular by virtue of the fact that the diaphragm 162 is lowered if the pressure difference is too high, thus disconnecting a fluid connection between the discharge channel 174 and the supply channel 172.

Gas disposed in the cylinder head space 104 can then no longer flow into the valve device 109 through the inlet 130.

When the predetermined pressure difference between the cylinder head space 104 and the suction device drops back below the threshold, the valve device 109 is held open by means of the spring element 166.

Gas flowing in then flows through the oil-separation device 110 of the valve device 109 and is finally removed from the cylinder head cover 100 via the suction connection piece 116.

When flowing through the oil-separation device 110, the gas in particular flows past the flow-diversion elements 132 and through the filter element 136.

In the process, oil contained in the gas is separated out. The gas is cleaned in this way.

The separated-out oil collects in the oil-collection chamber 138 below the filter element 136 and can be admitted back into the cylinder head space 104 outside the valve device 109 via the drainage valve 152.

By virtue of the fact that those chambers 144 of the valve device 109 through which the gas flows are formed substantially exclusively by the cover body 112, the integral base body 126 and the covering element 128, and by virtue of the fact that the chambers 144, on account of the welded joints between the cover body 112 and the base body 126 and between the base body 126 and the covering element 128, are of reliably fluid-tight configuration, the valve device 109 is not only easy to produce, but also allows reliable pressure regulation in the cylinder head space 104.

The invention claimed is:

1. A cylinder head cover for an internal combustion engine, comprising:
   a cover body for covering a cylinder head of the internal combustion engine; and
   a valve device which comprises a valve body and a base body for receiving the valve body,
      wherein the base body of the valve device is fixed to an inner side of the cover body,
      wherein a plurality of chambers of the valve device are formed by means of the base body and the cover body,
      wherein the valve device comprises a covering element which, in order to cover two or more of the plurality of chambers of the valve device, is fixed to the base body of the valve device by means of a welded joint,
      wherein two or more of the plurality of chambers of the valve device are closed off in a fluid-tight manner with respect to an environment surrounding the valve device by means of the covering element, and wherein the polarity of chambers of the valve device comprises a suction chamber which is connected to a suction connection piece of the cover body.

2. The cylinder head cover as claimed in claim 1, wherein the valve body is of multi-part configuration.

3. The cylinder head cover as claimed in claim 1, wherein the plurality of chambers of the valve device comprises at least three chambers, which are covered and/or sealed by means of the covering element.

4. The cylinder head cover as claimed in claim 1, wherein the cover body, the base body and/or the covering element comprise a plastics material or are formed from a plastics material.

5. The cylinder head cover as claimed in claim 1, wherein the cover body, the base body and/or the covering element are formed as injection-molded components.

6. The cylinder head cover as claimed in claim 1, wherein the base body comprises at least one oil-separation element, at least one flow-diversion element, at least one oil-collection chamber, at least one filter receptacle for receiving a filter element and/or at least one valve receptacle for receiving the valve body.

7. The cylinder head cover as claimed in claim 1, wherein the base body is formed integrally with at least one oil-separation element, at least one flow-diversion element, at least one oil-collection chamber, at least one filter receptacle for receiving a filter element and/or at least one valve receptacle for receiving the valve body.

8. The cylinder head cover as claimed in claim 1, wherein two or more of the plurality of chambers of the valve device are fluid-connected to one another by means of the covering element.

9. The cylinder head cover as claimed in claim 1, wherein the valve device comprises a pressure-regulating valve device for regulating an internal pressure in a cylinder head space relative to an external pressure in an external environment surrounding the cylinder head cover.

10. A cylinder head cover for an internal combustion engine, comprising:
a cover body for covering a cylinder head of the internal combustion engine; and
a valve device which comprises a valve body and a base body for receiving the valve body,
wherein the base body of the valve device is fixed to an inner side of the cover body,
wherein a plurality of chambers of the valve device are formed by means of the base body and the cover body,
wherein the valve device comprises a covering element which, in order to cover two or more of the plurality of chambers of the valve device, is fixed to the base body of the valve device by means of a welded joint,
wherein two or more of the plurality of chambers of the valve device are closed off in a fluid-tight manner with respect to an environment surrounding the valve device by means of the covering element, and
wherein in the plurality of chambers of the valve device comprises a reference chamber which adjoins the cover body and is in fluid communication with an external environment surrounding the cylinder head cover by means of a through-opening disposed in the cover body.

11. A method for producing a cylinder head cover, comprising:
providing a cover body which in the installed state of the cylinder head cover is arranged on an engine block of the internal combustion engine and covers a cylinder head of the internal combustion engine;
providing a base body of a valve device; and
fixing the base body of the valve device to an inner side of the cover body such that a plurality of chambers of the valve device are formed by means of the base body and the cover body,
wherein two or more of the plurality of chambers of the valve device are covered by means of a covering element of the valve device by way of the covering element being fixed to the base body of the valve device, by means of a welded joint,
wherein two or more of the plurality of chambers of the valve device are closed off in a fluid-tight manner with respect to an environment surrounding the valve device by means of the covering element, and
wherein the plurality of chambers of the valve device comprises a suction chamber which is connected to a suction connection piece of the cover body.

12. The method as claimed in claim 11, wherein the cover body, the base body and/or the covering element are produced by a plastics injection-molding process.

13. The method as claimed in claim 11, wherein at least one valve body, in particular a pressure-regulating valve device, is introduced into a valve receptacle of the base body of the valve device before the base body is fixed to the cover body.

14. The method as claimed in claim 11, wherein at least one filter element is introduced into a filter receptacle of the base body of the valve device before the base body is fixed to the cover body.

* * * * *

UNITED STATES PATENT AND TRADEMARK OFFICE
CERTIFICATE OF CORRECTION

PATENT NO. : 10,533,517 B2
APPLICATION NO. : 15/390643
DATED : January 14, 2020
INVENTOR(S) : Peter Laichinger et al.

It is certified that error appears in the above-identified patent and that said Letters Patent is hereby corrected as shown below:

In the Claims

Column 8, Line 49, cancel the text beginning with "1. A cylinder head cover" to and ending "a suction connection piece of the cover body." In Column 9, Line 3, and insert the following claim:
--1. A cylinder head cover for an internal combustion engine, comprising:
    a cover body for covering a cylinder head of the internal combustion engine; and
    a valve device which comprises a valve body and a base body for receiving the valve body,
    wherein the base body of the valve device is fixed to an inner side of the cover body,
    wherein a plurality of chambers of the valve device are formed by means of the base body and the cover body,
    wherein the valve device comprises a covering element which, in order to cover two or more of the plurality of chambers of the valve device, is fixed to the base body of the valve device by means of a welded joint,
    wherein two or more of the plurality of chambers of the valve device are closed off in a fluid-tight manner with respect to an environment surrounding the valve device by means of the covering element, and
    wherein the plurality of chambers of the valve device comprises a suction chamber which is connected to a suction connection piece of the cover body.--

Signed and Sealed this
Ninth Day of March, 2021

Drew Hirshfeld
*Performing the Functions and Duties of the
Under Secretary of Commerce for Intellectual Property and
Director of the United States Patent and Trademark Office*